(12) United States Patent
Rardon et al.

(10) Patent No.: US 7,763,354 B2
(45) Date of Patent: Jul. 27, 2010

(54) WATERBORNE 2K COATING COMPOSITION HAVING GOOD POT LIFE

(75) Inventors: Lori S. Rardon, Gibsonia, PA (US); Stephen J. Thomas, Aspinwall, PA (US); Kaliappa G. Ragunathan, Gibsonia, PA (US); Edouard Kaczynski, Sommaing sur Ecaillon (FR)

(73) Assignee: PPG Industries Ohio, Inc., Cleveland, OH (US)

( * ) Notice: Subject to any disclaimer, the term of this patent is extended or adjusted under 35 U.S.C. 154(b) by 753 days.

(21) Appl. No.: 10/245,028

(22) Filed: Sep. 17, 2002

(65) Prior Publication Data

US 2004/0053056 A1    Mar. 18, 2004

(51) Int. Cl.
*B32B 7/00* (2006.01)
*B32B 7/40* (2006.01)
*B32B 27/06* (2006.01)
*B32B 27/36* (2006.01)
*C08F 32/00* (2006.01)

(52) U.S. Cl. ............... 428/411.1; 428/423.1; 428/480; 428/500; 525/326.1; 525/525; 525/418

(58) Field of Classification Search ............... 428/423.1, 428/423.3, 522, 411.1, 480, 500; 524/839, 524/845; 525/326.1, 418
See application file for complete search history.

(56) References Cited

U.S. PATENT DOCUMENTS

| | | | | | |
|---|---|---|---|---|---|
| 4,057,527 | A | * | 11/1977 | Columbus | 524/272 |
| 5,314,945 | A | * | 5/1994 | Nickle et al. | 524/507 |
| 5,830,928 | A | | 11/1998 | Faler et al. | 523/502 |
| 5,969,030 | A | | 10/1999 | Grandhee | 524/457 |
| 5,972,809 | A | | 10/1999 | Faler et al. | 442/103 |

FOREIGN PATENT DOCUMENTS

| | | |
|---|---|---|
| EP | 1 227 116 A1 | 1/2002 |
| GB | 2 351 680 A | 1/2001 |
| WO | WO 95/26384 A | 10/1995 |
| WO | WO 02/31016 A1 | 4/2002 |

OTHER PUBLICATIONS

Wicks, Zeno, "Coatings," Encyclopedia of Polymer Science and Technology, John Wiley & Sons, Inc., online posting date Oct. 22, 2001.*

* cited by examiner

*Primary Examiner*—Thao T. Tran
(74) *Attorney, Agent, or Firm*—Diane R. Meyers

(57) ABSTRACT

A waterborne coating composition comprising at least one base neutralized active hydrogen containing film-forming resin and a water dispersible carbodiimide crosslinker capable of reacting with the film-forming resin to form a crosslinked film.

22 Claims, No Drawings

WATERBORNE 2K COATING COMPOSITION HAVING GOOD POT LIFE

FIELD OF THE INVENTION

The present invention relates to waterborne coating compositions, especially base neutralized waterborne coating compositions having carbodiimide crosslinkers.

BACKGROUND OF THE INVENTION

Waterborne coating compositions are in demand in the automotive refinish market due to increasingly strict environmental regulations. As it relates to the present invention, waterborne coating compositions can be utilized in two ways. The first utilization is as part of a two layer coating system comprising a basecoat layer and a clearcoat layer ("basecoat plus clearcoat system"). The second utilization is as a single coating layer ("direct gloss system").

A commercially acceptable waterborne coating composition for the automotive refinish market must satisfy certain requirements. The primary requirements are as follows. The waterborne coating composition must cure at ambient temperatures or slightly higher and demonstrate good pot life, good water resistance, etc. To date, it has been very difficult to formulate waterborne coating compositions that meet the requirements of the automotive refinish market.

In an attempt to improve certain performance properties of waterborne coating compositions, carbodiimide crosslinkers have been included in the compositions. Although the inclusion of carbodiimide crosslinkers improves water resistance and other coating properties, the pot life of such compositions is poor. The present invention provides a base neutralized waterborne coating composition having a carbodiimide crosslinker which exhibits improved pot life.

SUMMARY OF THE INVENTION

In one embodiment, the present invention is a waterborne coating composition comprising:
  a. at least one base neutralized active hydrogen containing film-forming resin; and
  b. a water dispersible carbodiimide capable of reacting with said film-forming resin to form a crosslinked film.

In another embodiment, the present invention is a waterborne coating system comprising a clearcoat composition applied over a waterborne basecoat composition, the waterborne basecoat composition comprising:
  a. at least one base neutralized active hydrogen containing film-forming resin;
  b. a water dispersible carbodiimide capable of reacting with the film-forming resin to form a crosslinked film.

In yet another embodiment, the present invention is a multi-layer composite coating comprising a basecoat formed from a waterborne basecoat film-forming composition and a clearcoat formed from a clearcoat film-forming composition applied over the basecoat, the waterborne basecoat film-forming composition comprising:
  a. at least one base neutralized active hydrogen containing film-forming resin; and
  b. a water dispersible carbodiimide capable of reacting with the film-forming resin to form a crosslinked film.

DETAILED DESCRIPTION OF THE INVENTION

The present invention is a waterborne coating composition. The waterborne coating composition of the present invention comprises at least one base neutralized active hydrogen containing film-forming resin. The descriptive phrase "base neutralized" indicates a base is utilized to neutralize the active hydrogen containing film-forming resin. Suitable bases include amines and inorganic bases like lithium hydroxide and potassium hydroxide. Suitable amines include ammonia and any primary, secondary, and tertiary amines. Tertiary amines are preferred.

The base is usually present in the waterborne coating composition in an amount necessary to neutralize the active hydrogen containing film-forming resin from between 100 to 200 percent. A 100 percent neutralization means that the mole ratio of base to acid is 1:1, and a 70 percent neutralization means that the mole ratio of base to acid is 7:10.

The descriptive phrase "active hydrogen containing" indicates the film-forming resin must have a group capable of reacting with a carbodiimide group such as a carboxyl group, an alcoholic hydroxyl group, phenolic hydroxyl groups, and thiols. Suitable active hydrogen containing film-forming resins include polyesters, polyurethanes, acrylic polymers, polyamides, and polyethers. The polymers used as the film-forming resin of the present invention are prepared with unreacted carboxylic acid groups to impart the requisite acid functionality.

Suitable acrylic polymers include copolymers containing carboxylic acid groups and acid groups of sulfur and phosphorus. These acrylic polymers and ways of preparing them are well known in the art. For example, these acrylic polymers can be synthesized from acid monomers and one or more alkyl esters of (meth)acrylic acid. Suitable acid monomers include: (meth)acrylic acid, maleic acid, fumaric acid, crotonic acid, itaconic acid, 2-sulfo ethyl methacrylate, 2-acrylamido-2-methyl-1-propane sulfonic acid, (meth)acrylamido methyl phosphonic acid, and 2-phosphoethyl (meth)acrylate. Monoalkyl esters of maleic acid, fumaric acid, and itaconic acid can also be used to synthesize the acrylic polymers.

Suitable alkyl esters of acrylic acid or methacrylic acid include aliphatic or cycloaliphatic alkyl esters containing from 1 to 30 carbon atoms in the alkyl group; preferably 4 to 18 carbon atoms in the alkyl group. Methyl methacrylate, ethyl methacrylate, butyl methacrylate, ethyl acrylate, butyl acrylate, 2-ethyl hexyl acrylate, and hydroxy ethyl(meth)acrylate are all examples of suitable alkyl esters of (meth)acrylic acid.

Suitable acrylic polymers further include copolymers synthesized from one of the abovementioned monomers and one or more of the following polymerizable ethylenically unsaturated monomers: vinyl aromatic compounds such as styrene and vinyl toluene; nitriles such as acrylonitrile and methacrylonitrile; amides such as acrylamide and methacrylamide; vinyl and vinylidene halides such as vinyl chloride; and vinylidene chloride and vinyl esters such as vinyl acetate.

Polyesters and alkyd resins which can be utilized as the film-forming resin of the present invention and methods of preparing them are well known in the art. For example, the polyester can be prepared via condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid and trimellitic acid.

Similarly to the above, polyesters and alkyd resins can be formed from acids of sulfur and phosphorus as is well known in the art. Suitable acids of sulfur and phosphorus include 2-phosphonobutane-1,2,4-tricarboxylic acid, and 5-sulfo isophthalic acid.

Polyurethanes which can be used as the film-forming resin of the present invention and methods of preparing them are well known in the art. For example, the polyurethane can be prepared by reacting polyester polyols or acrylic polyols with a polyisocyanate such that the OH/NCO equivalent ratio is greater than 1:1. Suitable polyisocyanates are aliphatic polyisocyanates, aromatic polyisocyanates, and mixtures thereof.

Optionally, the active hydrogen containing film-forming resin can have hydroxyl functionality. The hydroxyl functionality can be associated with the carboxylic acid functional polymer or it can be present as a separate hydroxyl functional polymer. Examples of suitable hydroxyl functional polymers include acrylic polyols, hydroxyl functional polyesters, and polyurethanes. Typically, the hydroxyl value of the polymers ranges from 10 to 100 mg KOH per gram of resin solids and are present in amounts ranging from 45 to 95 weight percent based on the resin solids weight of the active hydrogen containing film-forming resin.

The active hydrogen containing film-forming resin of the present invention typically has the following characteristics. The active hydrogen containing film-forming resin typically has a weight average molecular weight greater than 1,000 as determined by gel permeation chromatography using a polystyrene standard. The active hydrogen containing film-forming resin typically has a number average molecular weight greater than 500 as determined by gel permeation chromatography using a polystyrene standard. The active hydrogen containing film-forming resin typically has an acid value ranging from about 5 mg KOH/g to about 738 mg KOH/g or about 10 mg KOH/g to about 200 mg KOH/g or about 10 mg KOH/g to about 45 mg KOH/g.

The active hydrogen containing film-forming resin is usually present in the waterborne coating composition in an amount ranging from about 10 to about 100 weight percent or about 45 to about 85 weight percent where the weight percent is determined from the ratio of resin solids in the active hydrogen containing film-forming resin to the total resin solids of the composition.

The waterborne coating composition of the present invention also comprises a water dispersible carbodiimide crosslinker. The phrase "water dispersible" encompasses carbodiimide dissolved or dispersed in aqueous phase. In order to utilize certain carbodiimides in the present invention, it may be necessary to modify the carbodiimides to make them water dispersible. Techniques for modifying carbodiimides to make them water dispersible are well known in the art.

Suitable water dispersible carbodiimide crosslinkers include an aliphatic or aromatic dinitrogen analogue of carbonic acid of the generalized structure: RN=C=NR$_1$ where R and R$_1$ are hydrogen, aliphatic or aromatic groups. The aliphatic groups comprise alkyl chains and can include a carbodiimide such as dicyclohexyl carbodiimide. Oligomeric or polymeric carbodiimide crosslinkers can also be used.

The preparation of water dispersible carbodiimide crosslinkers is well known in the art. Suitable water dispersible carbodiimide crosslinkers can be prepared by incorporating minor amounts of an amine such as dimethyl aminopropylamine and an alkyl sulfonate or sulfate into the carbodiimide structure. Suitable water dispersible carbodiimides can also be prepared by incorporating polyethylene oxide or polypropylene oxide into the carbodiimide structure.

Suitable water dispersible carbodiimides are commercially available. For example, Ucarlink XL-29SE, XL-20 commercially available from Union Carbide and Carbodilite VO2-L2 commercially available from Nisshinbo Industries, Inc. can be used in the present invention.

The concentration of the dispersed carbodiimide in the aqueous medium is usually at least 1 percent by weight based on the weight of the aqueous dispersion and usually from about 2 to 60 percent by weight based on the weight of the aqueous dispersion.

In the waterborne coating composition of the present invention, the water dispersible carbodiimide crosslinker is typically present in amounts ranging from about 5 to about 50 or about 10 to 35 or about 15 to 25, weight percent resin solids based on total resin solids.

Optionally, the waterborne coating composition of the present invention comprises a water dispersible polyisocyanate. The phrase "water dispersible" encompasses polyisocyanate dissolved or dispersed in aqueous phase. In order to utilize certain polyisocyanates in the present invention, it may be necessary to modify the polyisocyanates to make them water dispersible. Techniques for modifying polyisocyanates to make them water dispersible are well known in the art.

The water dispersible polyisocyanates can be blocked or nonblocked. Suitable blocking agents are well known in the art.

Suitable water dispersible polyisocyanates include multifunctional isocyanates and diisocyanates. Suitable multifunctional isocyanates include a wide variety of monomeric and oligomeric polyfunctional isocyanates. Examples include the biuret adduct of 3 molecules of a diisocyanate with 1 molecule of water, the adduct of an at least trifunctional polyol with 1 molecule of a diisocyanate per hydroxyl equivalent, isocyanurate group-containing compounds, 1,3,5-triisocyanatobenzene, 2,4,6-triisocyanatoluene, and uretdione.

Suitable multifunctional isocyanates are commercially available. Bayhydur VPLS 2319, Desmodur N, Desmodur L, and Desmodur N3390 are commercially available from Bayer Corporation. Tolonate HDB and Tolonate HDT-LV are commercially available from Rhone Poulenc. And, Cythane 3160 is commercially available from BASF Group.

Examples of suitable diisocyanates include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate, 4,4'-diphenylmethylene diisocyanate.

The concentration of the dispersed polyisocyanate in the aqueous medium is usually at least 1 and usually from about 2 to 60 percent by weight based on weight of the aqueous dispersion.

The amount of water dispersible polyisocyanate in the waterborne coating composition typically ranges from about 5 to about 50 or about 10 to 40 or about 15 to 35 weight percent resin solids based on total resin solids.

In one embodiment of the present invention, the waterborne coating composition is utilized as a single coating. A subsequent coating layer is not applied over the single coat. In the industry, this is referred to as a "direct gloss" system.

When the waterborne coating composition of the present invention is used in a direct gloss system, the composition can include certain additives to ensure the composition has sufficient durability and gloss. Conventional additives include pigments, UV absorbers, hindered amine light stabilizers, flow additives, and solvents. All of the aforementioned additives are well known in the art.

In another embodiment of the present invention, the waterborne coating composition is part of a basecoat plus clearcoat coating system. The waterborne coating composition of the present invention is the basecoat, and a clearcoat composition is applied over the waterborne coating composition.

The clearcoat composition can be waterborne or solventborne. Suitable waterborne clearcoat compositions are well known in the art. Suitable waterborne clearcoat compositions include a film-forming resin and a crosslinker system capable of reacting with the film-forming resin to form a crosslinked film. Examples of suitable waterborne clearcoat compositions are disclosed in U.S. Pat. Nos. 5,633,307 and 5,652,294 which are hereby incorporated by reference.

Suitable solventborne clearcoats are also well known in the art. Suitable solventborne clearcoats include one or more film-forming materials and one or more crosslinking materials capable of reacting with the film-forming materials to form a crosslinked film. Examples of suitable solventborne clearcoats are disclosed in U.S. Pat. Nos. 5,196,485 and 5,814,410 which are hereby incorporated by reference.

The waterborne coating composition of the present invention can be applied onto a substrate in the following manner. First, the waterborne coating composition is applied to at least a portion of the substrate which is to be coated. The waterborne coating composition can be applied by conventional means including brushing, dipping, flow coating, spraying, etc. Depending on the type of coating system, the waterborne coating composition may be cured via ambient or thermal means. Typically, the dry film thickness of the cured waterborne coating composition ranges from about 0.1 mils to about 2.0 mils or 0.3 mils to about 1.5 mils.

If the waterborne coating composition of the present invention is being used in a basecoat plus clearcoat system, after the waterborne coating composition is applied to the substrate, the clearcoat composition is applied over the waterborne coating composition. The coating system is then cured via ambient or thermal means. Typically, the dry film thickness of the cured clearcoat composition ranges from about 1.0 mil to about 5.0 mils or 1.8 mils to about 3.0 mils.

The waterborne coating system of the present invention can be applied to various substrates including wood, metal, glass, cloth, polymeric substrates and the like. The waterborne coating system of the present invention is particularly useful for coating metals and elastomeric substrates that are found on motor vehicles.

EXAMPLES

The present invention will be further illustrated by the non-limiting examples below. Table 1 contains formulation data for waterborne coating compositions according to the present invention. Table 2 describes the crosslinker system utilized in the exemplary coating systems. Table 3 lists the pot lives of various crosslinked waterborne coating systems.

The exemplary coating compositions according to the present invention were prepared by taking 100 g of a commercially available basecoat composition and then adding a certain amount of base. Amine was used as the base in the exemplary compositions. The basecoat and amine were then mixed to form the coating composition of the present invention. Specific compositional information for the Examples is shown below in Table 1.

TABLE 1

The Waterborne Coating Composition of the Present Invention

| Example | Dimethyl Ethanol Amine[2] | % Neutralized[5] | Approximate pH[6] |
|---|---|---|---|
| T408 Black BC[1] | | | |
| 1 | 100 g / None | 77.1 | 7.24 |
| 2 | 100 g / 0.10 g | 93.2 | 8.28 |
| 3 | 100 g / 0.20 g | 109.2 | 8.58 |
| 4 | 100 g / 0.25 g | 117.2 | 8.76 |
| 5 | 100 g / 0.30 g | 125.2 | 8.92 |
| 6 | 100 g / 0.35 g | 133.3 | 9.04 |
| 7 | 100 g / 0.40 g | 141.3 | 9.10 |
| 8 | 100 g / 0.50 g | 157.3 | 9.24 |
| T413 Blue BC[3] | | | |
| 9 | 100 g / None | 95.2 | 7.71 |
| 10 | 100 g / 0.20 g | 122.0 | 8.70 |
| 11 | 100 g / 0.50 g | 162.0 | 9.17 |
| T400 White BC[4] | | | |
| 12 | 100 g / None | 90.9 | 8.25 |
| 13 | 100 g / 0.20 g | 113.6 | 8.74 |
| 14 | 100 g / 0.50 g | 147.6 | 9.25 |

[1]T408 Envirobase ® Black basecoat commercially available from PPG Industries, Inc.
[2]Dimethyl ethanol amine is a hydroxyl amine commercially available from Huntsman Petrochemicals.
[3]T413 Envirobase ® Blue basecoat commercially available from PPG Industries, Inc.
[4]T400 Envirobase ® White basecoat commercially available from PPG Industries, Inc.
[5]The equivalents of base in basecoat divided by the equivalents of acid multiplied by 100.
[6]Two different sets of examples were formed using T408 Envirobase ® Black basecoat. The pH values are for only one set of data. The maximum variation between pH values in the different set of examples was ±0.27.

TABLE 2

Crosslinker Systems Utilized in the Exemplary Coating Systems
The following components were mixed together to form the crosslinker systems used in the exemplary coating systems.

| Component | Crosslinker System #1 | Crosslinker System #2 |
|---|---|---|
| Bayhydur VPLS 2319[1]/PM acetate[2] Blend (3:1 by weight) | 2.0 | |
| UCARLNK XL-29SE[3] | 2.5 | 2.5 |
| Deionized Water | 25.5 | 27.5 |

[1]A polyisocyanate product commercially available from Bayer Corp.
[2]A solvent which is commercially available from Eastman Chemical Company.
[3]A carbodiimide product commercially available from Union Carbide Corp.

TABLE 3

Exemplary Waterborne Coating Systems

| Coating Composition of Example | Amount of Coating Composition | Crosslinker System # | Amount of Crosslinker | Potlife[1] |
|---|---|---|---|---|
| 1 | 70 g | 1 | 30 g | 10 minutes |
| 2 | 70 g | 1 | 30 g | 45 minutes |
| 3 | 70 g | 1 | 30 g | 75 minutes |
| 4 | 70 g | 1 | 30 g | 75 minutes |
| 5 | 70 g | 1 | 30 g | 120 minutes |
| 6 | 70 g | 1 | 30 g | 120 minutes |
| 7 | 70 g | 1 | 30 g | 120 minutes |
| 8 | 70 g | 1 | 30 g | 120 minutes |
| 1 | 70 g | 2 | 30 g | 3 minutes |
| 2 | 70 g | 2 | 30 g | 30 minutes |
| 3 | 70 g | 2 | 30 g | 60 minutes |
| 4 | 70 g | 2 | 30 g | 100 minutes |
| 5 | 70 g | 2 | 30 g | 120 minutes |

TABLE 3-continued

Exemplary Waterborne Coating Systems

| Coating Composition of Example | Amount of Coating Composition | Crosslinker System # | Amount of Crosslinker | Potlife[1] |
|---|---|---|---|---|
| 6 | 70 g | 2 | 30 g | 210 minutes |
| 7 | 70 g | 2 | 30 g | 300 minutes |
| 8 | 70 g | 2 | 30 g | >300 minutes |
| 9 | 70 g | 1 | 30 g | 30 minutes |
| 10 | 70 g | 1 | 30 g | 150 minutes |
| 11 | 70 g | 1 | 30 g | >180 minutes |
| 12 | 70 g | 1 | 30 g | 180 minutes |
| 13 | 70 g | 1 | 30 g | >240 minutes |
| 14 | 70 g | 1 | 30 g | >240 minutes |

[1]The pot-life was determined by the following method. Initially, the basecoat and crosslinker system was combined in a container (time = 0). The container was then tipped over at various time intervals (for example, 10 mins, 25 mins, 40 mins, etc.) to check for liquid flow. The time at which the container was tipped over and the liquid was no longer flowing was recorded as the pot life.

Conclusions

The present invention provides a waterborne coating composition having good pot life. As shown in Table 3 above, the pot-life of crosslinked waterborne coating compositions according to the present invention can be increased by increasing the % neutralization of the waterborne coating composition.

What is claimed:

1. A waterborne coating composition comprising:
   a. at least one base neutralized active hydrogen containing film-forming resin; and
   b. at least one water dispersible carbodiimide crosslinker capable of reacting with the film-forming resin to form a crosslinked film,
   wherein the total neutralization of the base neutralized active hydrogen containing film-forming resin is greater than 100 and less than or equal to 200 percent.

2. The coating composition according to claim 1 wherein the at least one active hydrogen containing film-forming resin is selected from the group consisting of polyesters, polyurethanes, acrylic polymers, and mixtures thereof.

3. The coating composition according to claim 1 further comprising at least one water dispersible polyisocyanate.

4. The coating composition according to claim 3 wherein the amount of water dispersible polyisocyanate in the waterborne coating composition ranges from about 5 to about 50 weight percent resin solids based on total resin solids of the composition.

5. The coating composition according to claim 1 wherein the at least one active hydrogen containing film-forming resin has a number average molecular weight greater than 500 as determined by gel permeation chromatography using a polystyrene standard.

6. The coating composition of claim 1 wherein the at least one active hydrogen containing film-forming resin is present in the waterborne coating composition in an amount ranging from about 10 to about 100 weight percent determined from the ratio of resin solids in the active hydrogen containing film-forming resin to the resin solids of the composition.

7. The coating composition according to claim 1 wherein the at least one water dispersible carbodiimide crosslinker comprises an aliphatic dinitrogen analogue of carbonic acid of the generalized structure: $RN\!\!=\!\!C\!\!=\!\!NR_1$ where R and $R_1$ are hydrogen, aliphatic or aromatic groups.

8. The coating composition according to claim 1 wherein the at least one active hydrogen containing film-forming resin has a weight average molecular weight greater than 1,000 as determined by gel permeation chromatography using a polystyrene standard.

9. The coating composition of claim 1, wherein the base comprises an amine.

10. A substrate at least partially coated with a coating deposited from the coating composition of claim 1.

11. A coated substrate produced by a process comprising:
   a. depositing the coating composition of claim 1 onto at least a portion of the substrate; and
   b. at least partially curing the coating composition.

12. The coating composition according to claim 1, wherein the total neutralization of the base neutralized active hydrogen containing film-forming resin is between 109.2 and 200 percent.

13. The coating composition according to claim 1, wherein the at least one base neutralized active hydrogen containing film-forming resin is not water-dilutable.

14. A coating system comprising a clearcoat deposited from a clearcoat composition, wherein the clearcoat is deposited at least partially over a basecoat, wherein the basecoat is deposited from a basecoat composition, wherein the basecoat composition comprises a waterborne coating composition comprising:
   a. at least one base neutralized active hydrogen containing film-forming resin; and
   b. at least one water dispersible carbodiimide crosslinker capable of reacting with the film-forming resin to form a crosslinked film,
   wherein the total neutralization of the base neutralized active hydrogen containing film-forming resin is greater than 100 and less than or equal to 200 percent.

15. The coating system according to claim 14, wherein the basecoat composition comprises a waterborne coating composition further comprising at least one water dispersible polyisocyanate.

16. The coating system according to claim 14 wherein the at least one active hydrogen containing film-forming resin is selected from the group consisting of polyesters, polyurethanes, acrylic polymers, and mixtures thereof.

17. The coating system according to claim 14 wherein the at least one active hydrogen containing film-forming resin is present in the waterborne coating composition in an amount ranging from about 10 to about 100 weight percent determined from the ratio of resin solids in the active hydrogen containing film-forming resin to the total resin solids of the composition.

18. The coating system according to claim 14 wherein the at least one active hydrogen containing film-forming resin has a number average molecular weight greater than 500 as determined by gel permeation chromatography using a polystyrene standard.

19. The coating system of claim 14 wherein the at least one water dispersible carbodiimide crosslinker comprises an aliphatic dinitrogen analogue of carbonic acid of the generalized structure: $RN\!\!=\!\!C\!\!=\!\!NR_1$ where R and $R_1$ are hydrogen, aliphatic or aromatic groups.

20. The coating system of claim 14, wherein the clearcoat composition comprises a waterborne film-forming composition.

21. The coating system of claim 14, wherein the base comprises an amine.

22. A process for coating a substrate comprising:
   a. depositing onto at least a portion of the substrate the coating composition of claim 1; and
   b. at least partially curing the coating composition.

* * * * *